(12) United States Patent
Oda et al.

(10) Patent No.: US 6,707,233 B2
(45) Date of Patent: Mar. 16, 2004

(54) ULTRASONIC MOTOR

(75) Inventors: Nobumitsu Oda, Toyohashi (JP); Takashi Fukui, Aichi-ken (JP); Yoshihiro Adachi, Hamakita (JP)

(73) Assignee: ASMO Co., LTD (JP)

( * ) Notice: Subject to any disclaimer, the term of this patent is extended or adjusted under 35 U.S.C. 154(b) by 0 days.

(21) Appl. No.: 09/735,599

(22) Filed: Dec. 12, 2000

(65) Prior Publication Data

US 2001/0022485 A1 Sep. 20, 2001

Related U.S. Application Data

(63) Continuation of application No. 09/215,605, filed on Dec. 17, 1998, now Pat. No. 6,211,604.

(30) Foreign Application Priority Data

Dec. 25, 1997 (JP) ............................................ 09-358523

(51) Int. Cl.[7] ......................... H01L 41/08; H01L 41/04; H01L 41/18; H02N 2/00
(52) U.S. Cl. ......................... 310/323.04; 310/323.05; 310/323.06
(58) Field of Search ................. 310/323.04, 323.05, 310/323.06, 323.03

(56) References Cited

U.S. PATENT DOCUMENTS

| | | | |
|---|---|---|---|
| 4,743,791 A | | 5/1988 | Kawai |
| 4,959,579 A | | 9/1990 | Kuwabara et al. |
| 5,025,186 A | * | 6/1991 | Tsukada ................. 310/323.06 |
| 5,049,774 A | | 9/1991 | Kuwabara et al. |
| 5,159,224 A | | 10/1992 | Kramer et al. |
| 5,247,220 A | * | 9/1993 | Miyazawa et al. ..... 310/323.05 |
| 5,313,132 A | | 5/1994 | Nakanishi |
| 5,406,160 A | * | 4/1995 | Shirasaki ............... 310/316.02 |
| 5,459,224 A | | 10/1995 | Pruett et al. |
| 6,104,124 A | * | 8/2000 | Suzuki et al. .......... 310/323.04 |
| 6,175,181 B1 | * | 1/2001 | Shirasaki ............... 310/323.04 |
| 6,201,338 B1 | * | 3/2001 | Naito et al. ............ 310/323.05 |
| 6,211,604 B1 | * | 4/2001 | Oda et al. .............. 310/323.09 |

FOREIGN PATENT DOCUMENTS

| | | |
|---|---|---|
| JP | 58154370 | 10/1983 |
| JP | 58201087 | 12/1983 |
| JP | 60266784 | 6/1987 |
| JP | 60266785 | 6/1987 |
| JP | 60266786 | 6/1987 |
| JP | 62260567 | 11/1987 |
| JP | 62300093 | 11/1987 |
| JP | 63084581 | 3/1988 |
| JP | 01218804 | 8/1989 |
| JP | 3-87442 | 9/1991 |
| JP | 4125075 | 4/1992 |
| JP | 05044383 | 2/1993 |
| JP | 5260770 | 10/1993 |
| JP | 05284964 | 11/1993 |
| JP | 7067363 | 3/1995 |
| JP | 7143766 | 6/1995 |
| JP | 07210699 | 8/1995 |
| JP | 8214569 | 8/1996 |
| JP | 63-073887 A | 4/1998 |

* cited by examiner

*Primary Examiner*—Nestor Ramirez
*Assistant Examiner*—J. Aguirrechea
(74) *Attorney, Agent, or Firm*—TraskBritt

(57) ABSTRACT

An ultrasonic motor includes a stator having a piezoelectric element and a rotor facing the stator. The piezoelectric element is annular and is polarized into segments in the circumferential direction. A flexible plate is fixed to the piezoelectric element with an electrode plate in between. The flexible plate includes a flexible substrate, a conductor, and a reinforcement. The conductor is located on a part of the flexible substrate to be electrically connected to the electrode plate. The reinforcement is located on the flexible substrate at a position that is off the conductor. The reinforcement suppresses vibration generated at a part of the piezoelectric element that is off the conductor, thereby stabilizing vibration of the piezoelectric element in the circumferential direction.

21 Claims, 14 Drawing Sheets

ULTRASONIC MOTOR

CROSS-REFERENCE TO RELATED APPLICATIONS

This application is a continuation of application Ser. No. 09/215,605, filed Dec. 17, 1998, now U.S. Pat. No. 6,211,604.

BACKGROUND OF THE INVENTION

The present invention relates to an ultrasonic motor. More particularly, the present invention pertains to an ultrasonic motor that maintains a constant pressing force by a rotor acting on a stator.

A typical ultrasonic motor has a stator and a rotor accommodated in a motor housing. The stator includes a piezoelectric element and is secured to the housing. The rotor contacts the stator with a lining member attached to the rotor in between. The rotor is pressed against the stator by a pressing member. A rotary shaft, which is supported by the housing, is coupled to the rotor to integrally rotate with the rotor. When provided with high frequency voltage, the piezoelectric element vibrates. The vibration of the element produces progressive waves between the stator and the rotor. The waves rotate the rotor.

The pressing member includes, for example, a supporting plate and a disk spring. The supporting plate is secured to the rotary shaft and is located next to the rotor at the opposite side of the stator. The disk spring is elastically deformed and is located between the supporting plate and the rotor. Thus, the rotor is pressed against the stator by the urging force of the disk spring.

The rotation characteristics of the ultrasonic motor are influenced by the urging force that presses the rotor against the stator. It is therefore necessary to properly adjust the urging force to obtain preferred rotation characteristics.

In a prior art motor, an adjustment washer having a predetermined thickness is placed between the rotor and the disk spring when installing the supporting plate and the disk spring. Thereafter, the urging force of the disk spring that presses the rotor against the stator is measured by a pressure gauge. If the measured force is not appropriate, the supporting plate and the disk spring are temporarily disassembled from the motor, and the adjustment washer is replaced with another washer having a different thickness. In this manner, the force that presses the rotor against the stator is adjusted.

The rotor is pressed against the stator with the lining member in between. That is, the rotor is separated from the stator by a distance corresponding to the thickness of the lining member. However, operation of the motor wears, or thins, the lining member. The rotor, which is pressed by the disk spring, approaches the stator by a distance corresponding to the wear of the lining member. This alters the flexion amount of the disk spring thereby changing the urging force of the disk spring. Accordingly, the force of the disk spring pressing the rotor against the stator changes with time.

In the prior art motor, a disk spring is assembled without considering future changes of its urging force due to wear of the lining member. Thus, even if the force of the rotor acting on the stator is appropriate when assembling the motor, the urging force of the disk spring will eventually be affected by wear of the lining member. As a result, the force urging the rotor against the stator will change. The rotation characteristics of the motor therefore depart from the factory settings.

SUMMARY OF THE INVENTION

Accordingly, it is an objective of the present invention to provide an ultrasonic motor that maintains the force pressing the rotor against the stator at a substantially constant value over time.

To achieve the foregoing and other objectives and in accordance with the purpose of the present invention, an ultrasonic motor is provided. The motor includes a stator, a rotor, a lining member and an elastic member. The stator has a piezoelectric element. The rotor faces the stator. The piezoelectric element vibrates the stator to rotate the rotor. The lining member is located between the stator and the rotor. The elastic member presses the rotor toward the stator. The force of the elastic member pressing the rotor changes in accordance with the deformation of the elastic member. The elastic member is pre-deformed during assembly such that its deformation in the axial direction of the motor is in a predetermined deformation range. The variation of the pressing force is relatively small for any deformation amount within the predetermined deformation range.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
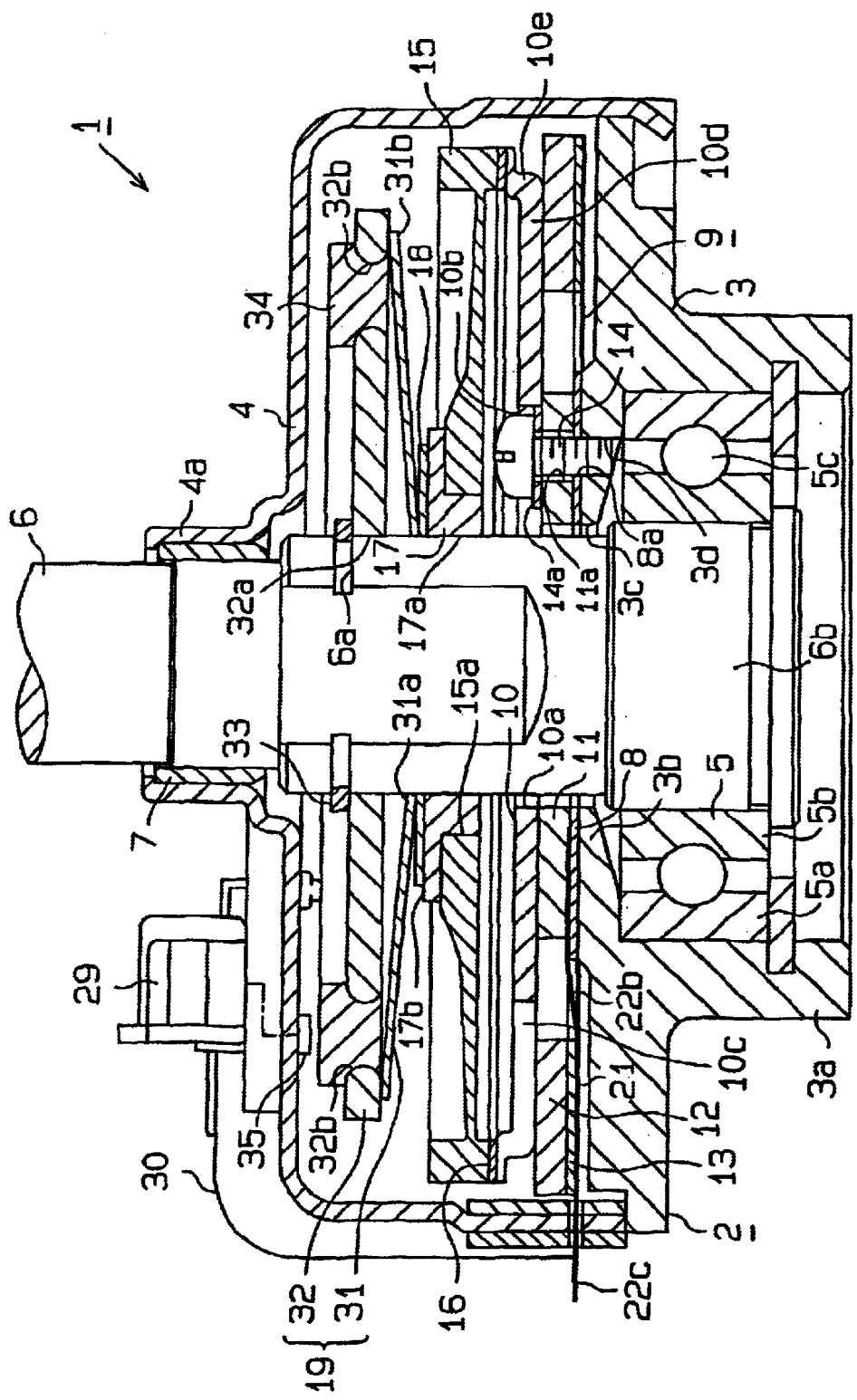
FIG. 1 is a cross-sectional view illustrating an ultrasonic motor according to one embodiment of the present invention.

A first embodiment of the present invention will now be described with reference to the drawings. The upper and lower directions mentioned herein refer to the upper and lower directions of FIG. 1. As shown in FIG. 1, a housing 2 of an ultrasonic motor 1 includes a base 3 and a cover 4, which is attached to the base 3. The base 3 includes a boss 3a for supporting a radial ball bearing 5 and a rim 3b extending radially inward from the upper end of the boss 3a. The rim 3b defines a hole 3c for receiving a rotary shaft 6. The rim 3b has threaded holes 3d (only one is shown). The cover 4 also has a boss 4a for supporting a sleeve bearing 7. The rotary shaft 6 is supported by the bearings 5, 7 to rotate relative to the housing 2.

A ring-shaped insulation gasket 8 is located on the top surface of the rim 3b of the base 3. A stator 9 is located on the top of the gasket 8. The stator 9 includes a diaphragm 10, a metal ring plate 11 brazed to the radially inner portion of the diaphragm's bottom surface, a base ring 12 brazed to the radially outer portion of the diaphragm's bottom surface and a ring shaped piezoelectric element 13 adhered to the bottom of the base ring 12. The diaphragm 10 is made of rolled steel such as cold rolled steel (SPCC). The ring plate 11 is located on the gasket 8. The stator 9, which includes integrally assembled parts, facilitates the assembly of the motor 1.

Figure 4:
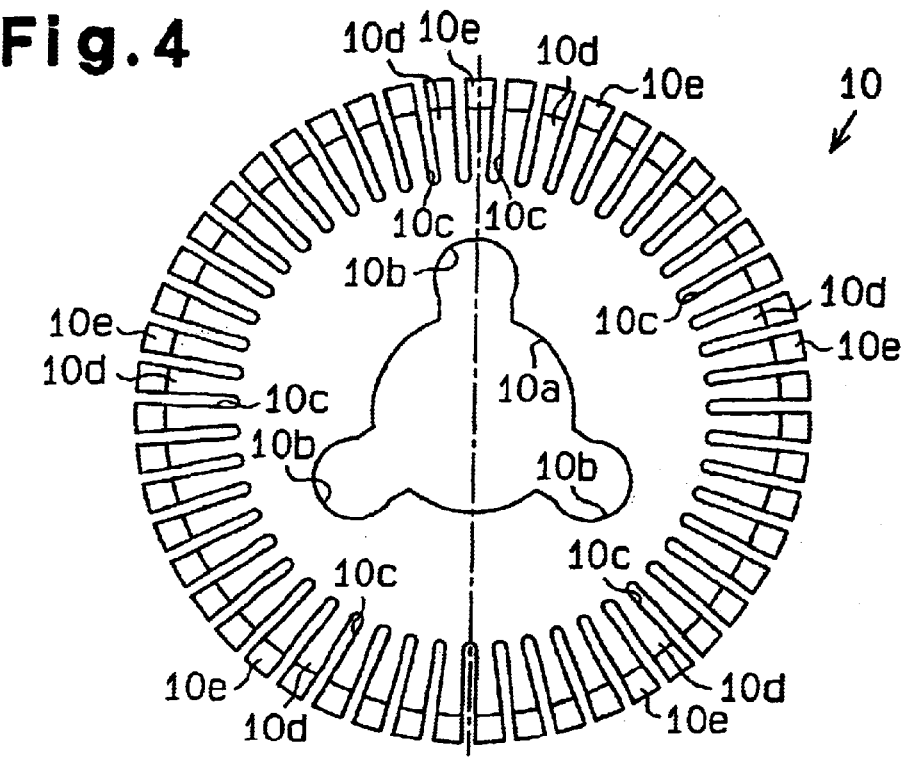
FIG. 4 is a plan view illustrating the diaphragm of the motor illustrated in FIG. 1.

As illustrated in FIG. 4, the diaphragm 10 has teeth 10d extending radially outward. Each pair of adjacent teeth 10d defines a slit 10c. The distal end of each tooth 10d is formed like a crank and includes a contact 10e. The diaphragm 10 has a hole 10a in its center to receive the rotary shaft 6. The diaphragm 10 also has holes 10b, which correspond to the holes 3d of the rim 3b. The holes 10b are connected to the hole 10a. As illustrated in FIG. 1, the gasket 8 and the metal ring plate 11 each have holes 8a, 11a, which correspond to the holes 3d of the rim 3b.

As illustrated in FIG. 1, a screw 14 having an insulation washer 14a is inserted into each set of the holes 10b, 11a, 8a of the diaphragm 10, the ring plate 11 and the gasket 8. The screw 14 is then screwed to the corresponding threaded hole 3d of the rim 3b. The screws 14 fasten the stator 9 to the base 3 with the gasket 8 in between. The gasket 8 and the insulation washers 14a electrically insulate the stator 9 from the base 3.

A rotor 15 is located above the stator 9. The rotor 15 is made of stainless steel or aluminum alloy. A lining member 16 is secured to the lower periphery of the rotor 15. The rotor 15 contacts the contacts 10e of the diaphragm 11 with the lining member 16 in between. The lining material 16 is made of, for example, polyimide resin and its thickness is 0.3 mm.

The rotor 15 has a hole 15a in its center. An insulation collar 17 is fitted in the hole 15a. The collar 17 rotates integrally with the rotor 15 and has a hole 17a in its center. The rotary shaft 6 is fitted in the hole 17a such that the shaft 6 rotates integrally with the collar 17. Thus, the collar 17 fixes the rotor 15 to the rotary shaft 5 such that the rotor 15 rotates integrally with the rotary shaft 6.

The upper surface 17b of the collar 17 is pressed by a pressing member 19. An adjustment washer 18 is located between the surface 17b and the pressing member 19. The pressing member 19 includes a disk spring 31 and a supporting plate 32. The disk spring 31 includes a small diameter portion 31a contacting the washer 18 and a large diameter portion 31b contacting the supporting plate 32. The plate 32 has a hole 32a in its center to receive the rotary shaft 16. The rotary shaft 6 has an engagement groove 6a. A snap ring 33 is fitted in the groove 6a. The snap ring 33 contacts the supporting plate 32 to prevent the plate 32 from moving upward. The rotor 15 is pressed against the stator 9 by a force corresponding to the urging force of the disk spring 31. The pressing member 19 rotates integrally with the rotor 15 and the rotary shaft 6. The collar 17 electrically insulates the rotor 15 from the pressing member 19 and the rotary shaft 6.

A connector 29 is secured to the upper wall of the cover 4. The connector 29 is electrically connected to the piezoelectric element 13 by a lead line 30. A control line (not shown) from a controller (not shown) is connected to the connector 29. The controller applies high-frequency voltage to the piezoelectric element 13. The applied voltage vibrates the element 13. The vibration is transmitted to the contacts 10e of the diaphragm 10 by the base ring 12 and vibrates the contacts 10e. The vibration of the contacts 10e generates progressive waves. The waves rotate the rotor 15, which is pressed against the contacts 10e. The rotation of the rotor 15 is transmitted to the rotary shaft 6.

Figure 2:
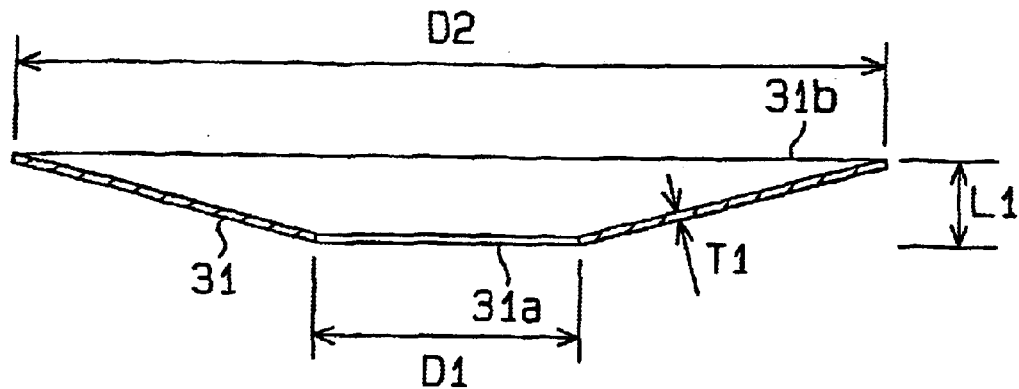
FIG. 2 is a cross-sectional view illustrating the disk spring of the motor illustrated in FIG. 1.

FIG. 2 shows the disk spring 31. The disk spring 31 is made, for example, of austenitic stainless steel. The thickness T1 of the disk spring 31 is 0.8 mm. The length L1 of the spring 31 before being installed in the motor 1, or the length of the spring 31 with no load acting on it, is 2.1 mm. The diameter D1 of the small diameter portion 31a is 15 mm, and the diameter D2 of the large diameter portion 31b is 52 mm. In FIGS. 1 and 2, the spring 31 has been illustrated without taking these measurements into consideration.

Figure 3:
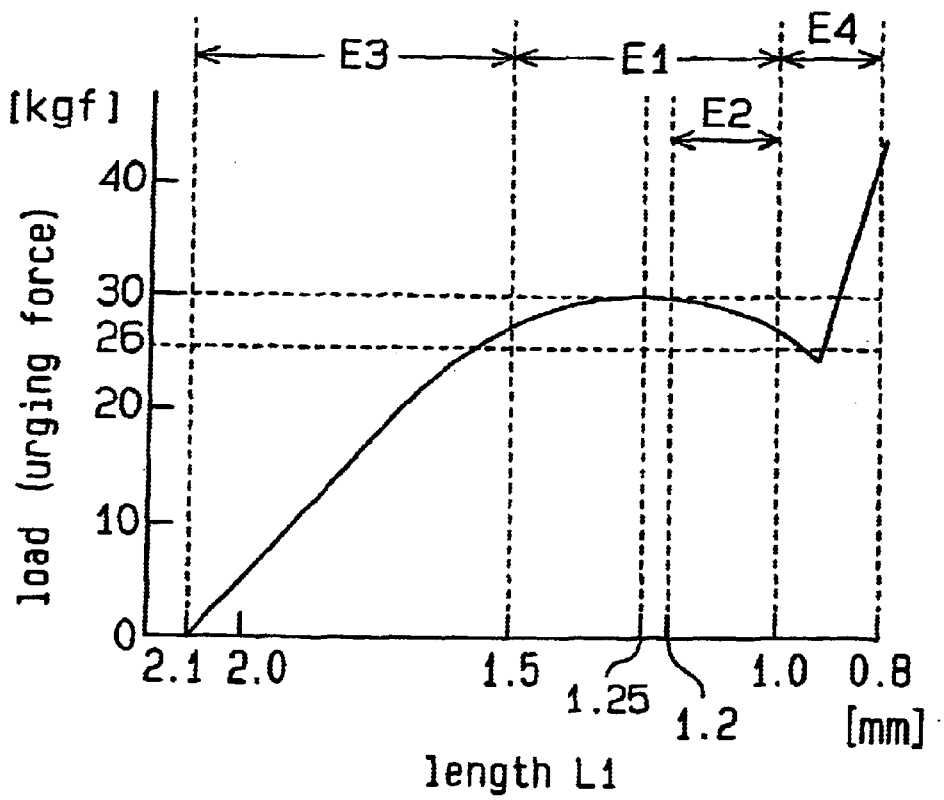
FIG. 3 is a graph showing the force-distance characteristics of the disk spring illustrated in FIG. 2.

The length L1 of the spring 31 changes as shown in FIG. 3 in accordance with a load in the axial direction. The change of the spring's axial length L1 is referred to as the flexion amount of the spring 31. The load acting on the spring 31 is the same as the urging force of the spring 31. Thus, the curve of the graph of FIG. 3 illustrates changes of the urging force of the spring 31 with respect to the flexion amount, or axial deformation, of the spring 31. The curve was obtained by measurement.

The force pressing the rotor 15 against the stator 9 is preferably between 26 to 30 kgf in order to obtain preferred rotation characteristics of the ultrasonic motor 1. In the first embodiment, the adjustment washer 18 is selected from washers of various thicknesses such that the force pressing the rotor 15 against the stator 9 (in other words, the urging force of the disk spring 31) is 30 kgf. That is, the washer 18 is selected such that the length L1 of the disk spring 31 is 1.25 mm. The force pressing the rotor 15 against the stator 9 is controlled by simply changing the thickness of the washer 18. The pressing force of the rotor 15 is therefore easily adjusted.

In the graph of FIG. 3, the length L1 of the spring 31 is 1.0 to 1.5 mm in a first region E1. In the first region E1, the force pressing the rotor 15 against the stator 9 is between 26 to 30 kgf, and changes of the spring length L1 are small. In other words, the pressing force changes by a relatively small amount for a given change in the flexion. Therefore, the first region E1 is a preferred range of flexion of the spring 31.

When the lining member 16 is worn, the rotor 15, which is pressed by the spring 31, approaches the stator 9 by the amount of the wearing of the lining member 16. This increases the length L1 of the spring 31. However, if the spring 31 is installed in the motor 1 such that its length L1 remains in the region E1, the urging force of the spring 31 changes by a small amount for a given change in the spring length L1. Therefore, wearing of the lining member 16 scarcely affects the force pressing the rotor 15 against the stator 9. The rotation characteristics of the motor 1 are thus constant over time.

The first region E1 includes a second region E2. The second region E2, in which the length L1 of the spring 31 is between 1.0 and 1.2 mm, is most preferable for the initial setting of the spring 31. In the first embodiment, the thickness of the lining member 16 is 0.3 mm. Therefore, even if the lining member 16 is completely worn, the length L1 of the spring 31 will not exceed 1.5 mm, and the length L1 remains in the first region E1 throughout the life of the motor. In other words, if a new motor 1 is used until the lining member 16 is completely worn, the urging force of the spring 31 remains in the acceptable range between 30 to 26 kgf. The rotation characteristics of the motor 1 are therefore maintained.

In a third region E3, in which the length L1 of the spring L1 is between 1.5 and 2.1 mm, the urging force of the spring 31 changes substantially in proportion to the length L1 (the flexion amount) of the spring 31. In the third region E3, the urging force of the spring 31 is greatly changed by a given change of its flexion amount. In other words, wear of the lining member 16 greatly changes the pressing force pressing the rotor 15 against the stator 9. It is therefore undesirable to use the spring 31 in the third region E3.

In a fourth region E4, in which the length L1 of the spring 31 is between 0.8 and 1.0 mm, the urging force of the spring 31 drastically changes in accordance with a given change of the length L1. That is, in the region E4, wear of the lining member 16 drastically changes the force pressing the rotor 15 against the stator 9. It is therefore undesirable to use the spring 31 in the fourth region E4.

In the motor 1 of FIG. 1, the disk spring 31 is used. However, the spring 31 may be replaced with other elastic members such as a coil spring, a leaf spring or a rubber spring.

In the motor 1 of FIG. 1, the adjustment washer 18 is located between the collar 17 and the disk spring 31. However, the adjustment washer 18 may be located between the disk spring 31 and the supporting plate 32, or between the supporting plate 32 and the snap ring 33. Further, the pressing force pressing the rotor 15 against the stator 9 may be adjusted by adjusting means other than the adjustment washer 18.

The motor 1 has the following features. As illustrated in FIG. 4, the diaphragm 10 has an odd number (fifty-one in this embodiment) of slits 10c along its circumference. The slits 10c are spaced apart at equal angular intervals and have equal widths. Therefore, a plane (represented by a dotted line in FIG. 4) that includes the axis of the diaphragm 10 can lie within only one of the slits 10c at a time. In other words, each slit 10c is not diametrically opposed to another slit 10c, but is diametrically opposed to one of the teeth 10d.

If two slits 10c were diametrically opposed, the diaphragm 10 could be easily bent along the diametric line between them. However, in the first embodiment, no diametric line is aligned with two slits 10c. This structure improves the strength of the diaphragm 10. As a result, the reliability of the motor 1 is improved.

The diaphragm 10 is made by pressing a rolled steel plate. Specifically, disks are punched from a rolled steel plate. Next, the fifty-one slits 10c are punched in the disk plate.

Although not shown in the drawings, a press die for forming the slits 10c has, for example, three slots spaced apart by equal angular intervals, that is, by 120-degree intervals. Therefore, one punching forms three slits 10c in the diaphragm 10. The formed slits 10c are spaced apart by 120 degrees. Since the diaphragm 10 need fifty-one slits 10c, which is a multiple of three, punching needs to be performed on a single diaphragm 10 seventeen times while slightly changing the relative orientation of the die between punches.

Rolled steel plate is manufactured by rolling a steel plate in one direction. When a slit 10c is punched parallel to the rolling direction, the rolled plate is weaker than when a slit 10c is punched transversely to the rolling direction.

The slits 10c are punched by a press die having three slots. That is, three slits 10c oriented in different directions are formed simultaneously. Compared to a method where one or more slits parallel to the rolling direction of the rolled steel plate are punched simultaneously, the method of the first embodiment deforms the diaphragm by a smaller degree when forming the slits 10c. Further, punching three slits 10c seventeen times forms fifty-one slits 10c. This improves the efficiency of the punching of the slits 10c. Alternatively, the press die may be formed to punch an odd number of equally spaced slots that is greater than three. This decreases the deformation of the diaphragm 10 when forming the slits 10c.

As described above, may teeth 10d are formed by punching the slits 10c. Thereafter, the distal end of each tooth 10d is pressed to form the crank-shaped contact 10e.

As described above, the diaphragm 10 has an odd number of slits 10c. This structure improves the strength of the diaphragm 10. The resultant diaphragm 10 resists bending. This permits the thickness of the diaphragm 10 to be minimized while preventing the diaphragm 10 from being deformed when the slits 10c are formed. This facilitates the manufacture of the diaphragm 10 and improves productivity.

Figure 5:
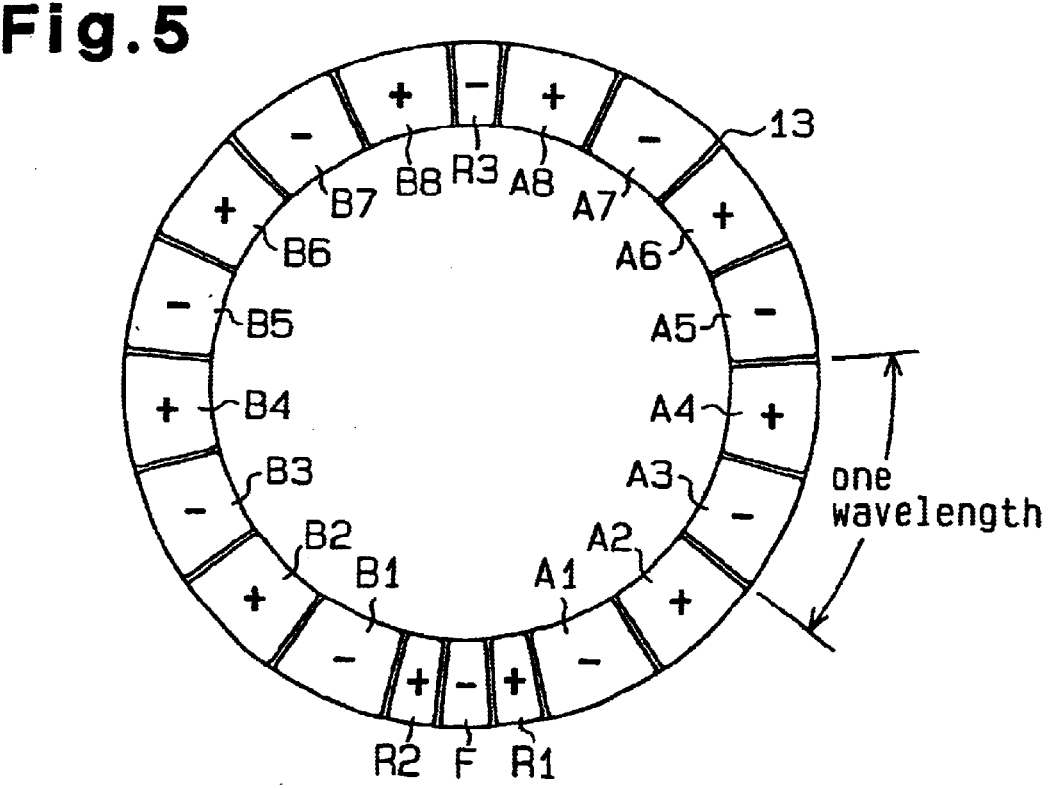
FIG. 5 is a plan view illustrating the piezoelectric element of the motor illustrated in FIG. 1.

The structure of the piezoelectric element 13 will now be described. The piezoelectric element 13 is attached to the diaphragm 10 with the base ring 12 in between. As shown in FIG. 5, the ring-shaped piezoelectric element 13 is polarized into twenty segments along its circumference. The polarities of each pair of adjacent segments are different. The segments include first to eighth A-phase segments A1–A8, first to eight B-phase segments B1–B8, three connecting segments R1–R3 and a feedback segment F. The feedback segment F is located between two connecting segments R1, R2, which are between the first A-phase segment A1 and the first B-phase segment B1. The connecting segment R3 is located between the eighth A-phase segment A8 and the eighth B-phase segment B8.

A controller (not shown) applies high frequency voltage to the A-phase segments A1–A8 and the B-phase segments B1–B8. There is a ninety-degree phase difference between the voltage sent to the A-phase segments A1–A8 and the voltage sent to the B-phase segments B1–B8. The piezoelectric element 13 produces progressive waves based on the applied voltage. The vibration of the waves is transmitted to the diaphragm 10. The feedback segment F generates voltage in accordance with vibration of the A-phase and B-phase segments A1–A8 and B1–B8 and outputs the generated voltage to the controller. The controller feedback controls the high frequency voltage applied to the A-phase and B-phase segments A1–A8 and B1–B8 based on this voltage.

The circumferential length of each of the A-phase and B-phase segments A1–A8 and B1–B8 is equal to a half of the wavelength of a progressive wave produced by the piezoelectric element 13. Therefore, a pair of adjacent segments A1–A8 and B1–B8 have a circumferential length equal to the wavelength of a progressive wave produced by the piezoelectric element 13. The circumferential length of each of the connecting segments R1–R3 and the feedback segment F is a half of that of each segment A1–A8, B1–B8. That is, each of the connecting segments R1–R3 and the feedback segment F has a circumferential length equal to one quarter of the wavelength of a progressive wave produced by the piezoelectric element 13. Therefore, the circumferential length of the piezoelectric element 13 is equal to nine wavelengths of the progressive waves produced by the element 13. In other words, when high frequency voltage is applied, the piezoelectric element 13 produces progressive waves of nine periods.

As illustrated in FIG. 4, the diaphragm 10 has fifty-one slits 10c and fifty-one teeth 10d. The number of the teeth 10d is not an integral multiple of the number of the progressive waves produced by the piezoelectric element 13, which is nine. Thus, as illustrated in FIG. 6, the teeth 10d do not correspond to the A-phase segments A1–A8 in the axial direction.

Figure 7A:
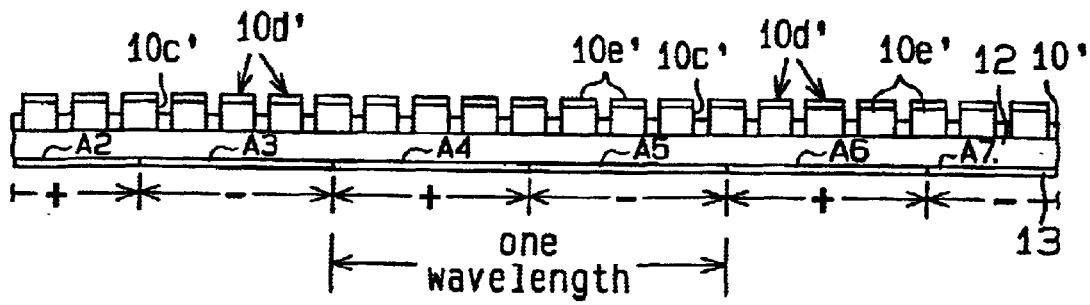
FIG. 7(a) is a development showing the position of a diaphragm relative to a piezoelectric element in a comparison example.
Figure 7B:
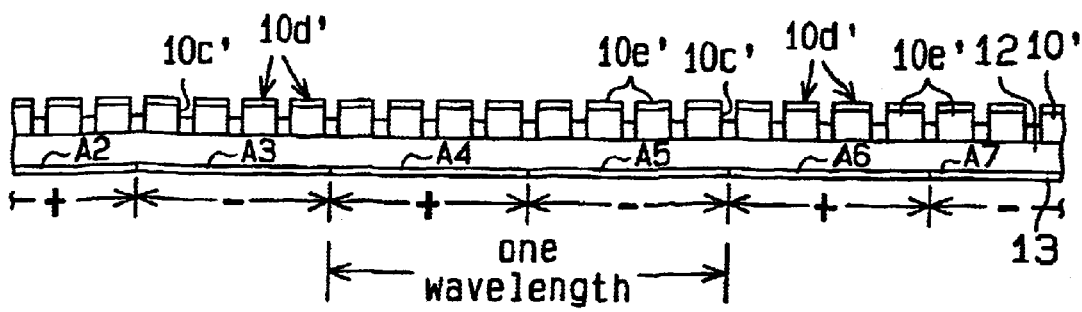
FIG. 7(b) is a development showing the position of a diaphragm relative to a piezoelectric element in a comparison example.

Suppose a diaphragm 10' having sixty-three slits 10c' and sixty-three teeth 10d' is attached to the piezoelectric element 13 illustrated in FIG. 5. In this case, the teeth 10d' regularly correspond to the A-phase segments A1–A8. FIG. 7(a) illustrates an example where a tooth 10d' is located above the border between adjacent segments A1–A8. However, as illustrated in FIG. 7(b), a slit 10c' can be located above the border of each pair of adjacent segments A1–A8.

When installing the diaphragm 10' that has sixty-three teeth 10d', the position of the diaphragm 10' relative to the piezoelectric element 13 differs from that of other diaphragms. In some motors, the diaphragm 10' and the piezoelectric element 13 are as illustrated in FIG. 7(a), whereas, in other motors, the diaphragm 10' and the element 13 are as illustrated in FIG. 7(b). The characteristics of progressive waves produced at the contacts 10e' of the teeth 10d' greatly differ between these two cases. This results in variations of rotation characteristics of manufactured motors. Thus, the magnitude and the frequency of the high frequency voltage applied to the piezoelectric element 13 and the pressing force pressing the rotor 15 against the stator 9 must be adjusted for each assembled motor, which is burdensome.

Figure 6:
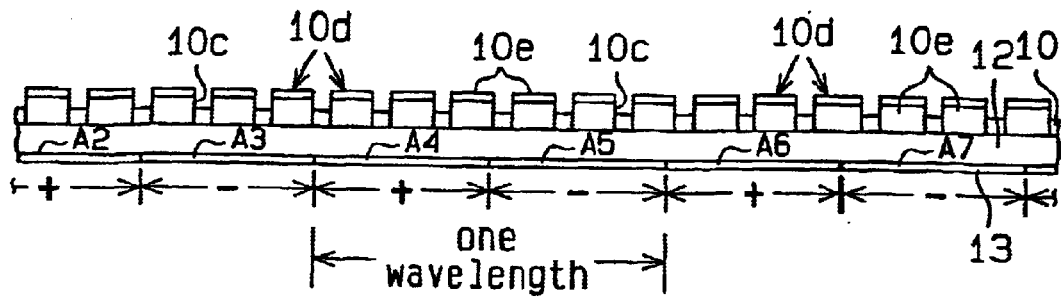
FIG. 6 is a development showing the position of the diaphragm relative to the piezoelectric element illustrated in FIG. 1.

In the first embodiment, the teeth 10d of the diaphragm 10 never correspond to the segments of the piezoelectric element 13 as illustrated in FIG. 6. This prevents the characteristics of progressive waves produced at the contacts 10e from varying in assembled motors, regardless of the angular position of the teeth 10d with respect to the segments of the piezoelectric element 13. The motor 1 according to the first embodiment therefore does not require the burdensome adjustment required for the motor having sixty-three slits 10c'.

Figure 8:
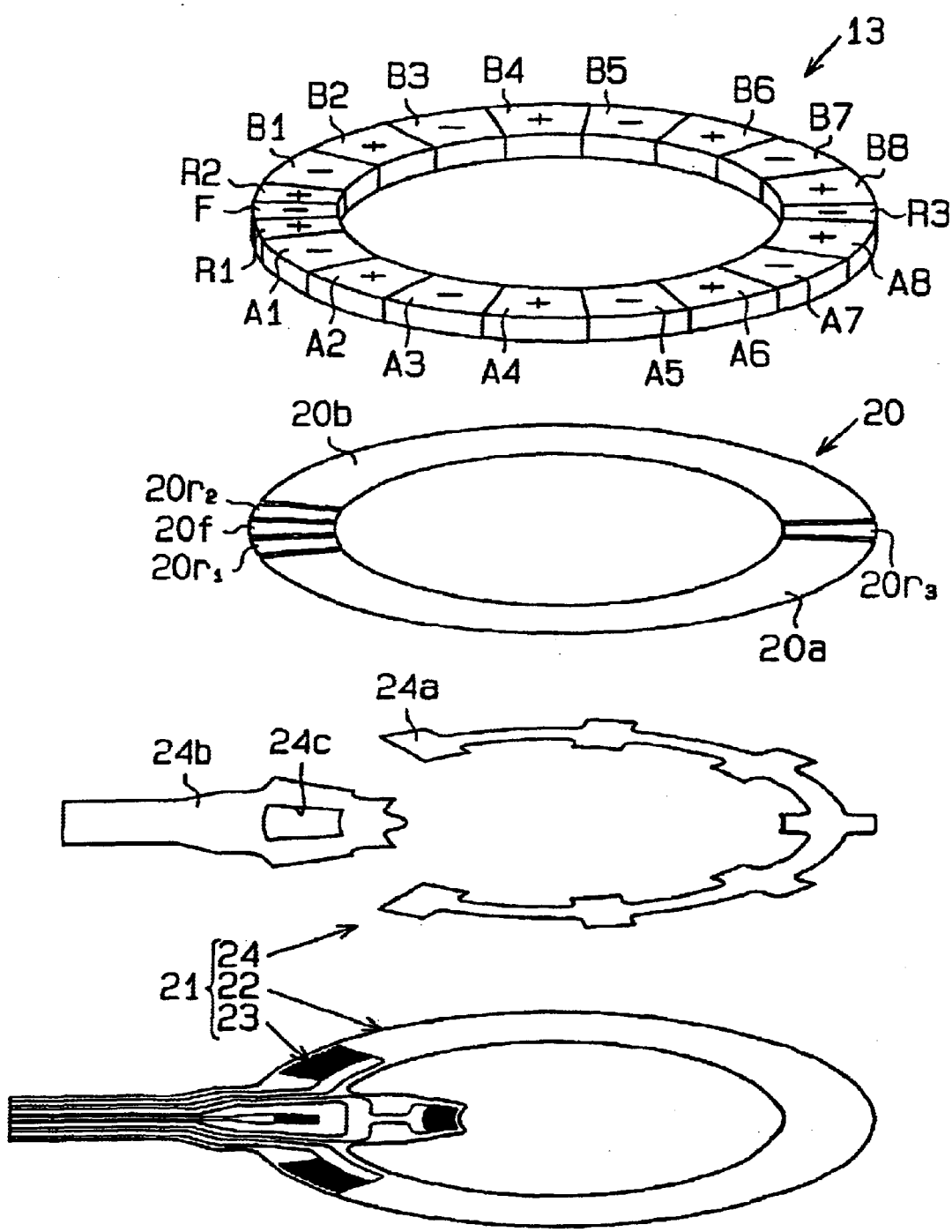
FIG. 8 is an exploded perspective view illustrating the piezoelectric element, the electrode plate and the flexible plate of the motor illustrated in FIG. 1.

As illustrated in FIG. 8, an electrode plate 20 is fixed to the bottom of the piezoelectric element 13. Specifically, the electrode plate 20 is printed or baked on the element 13. The electrode plate 20 includes an A-phase electrode 20a, which corresponds to the A-phase segments A1–A8, a B-phase electrode 20b, which corresponds to the B-phase segment B1–B8, connecting electrodes $20r_1$–$20r_3$, which correspond to the connecting segments R1–R3, respectively, and a feedback electrode 20f, which corresponds to the feedback segment F.

A flexible plate 21 is fixed to the lower surface of the electrode plate 20. The plate 21 includes a flexible substrate 22 and conductors 23 fixed to the top surface of the substrate 22 and a cover layer 24. The substrate 22 and the cover layer 24 are made of polyimide resin. However, the substrate 22 and the cover layer 24 may be made of any flexible resin.

Figure 9:
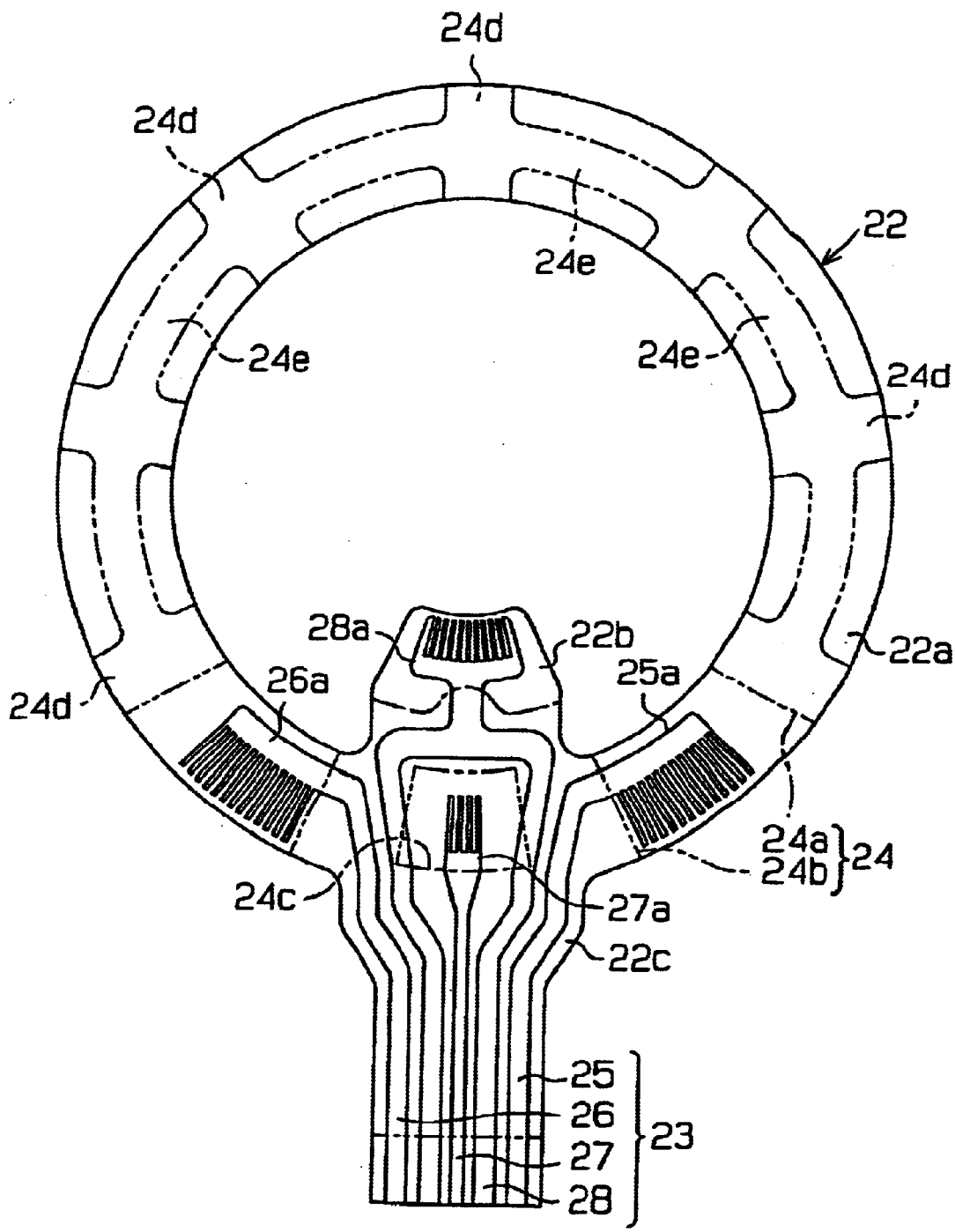
FIG. 9 is a plan view illustrating the flexible plate of FIG. 8.

As illustrated in FIG. 9, the flexible substrate 22 includes a ring 22a corresponding to the electrode plate 20, an inner extension 22b projecting inward from the ring 22a and an outer extension 22c projecting outward at a location corresponding to the inner extension 22b.

Figure 10:
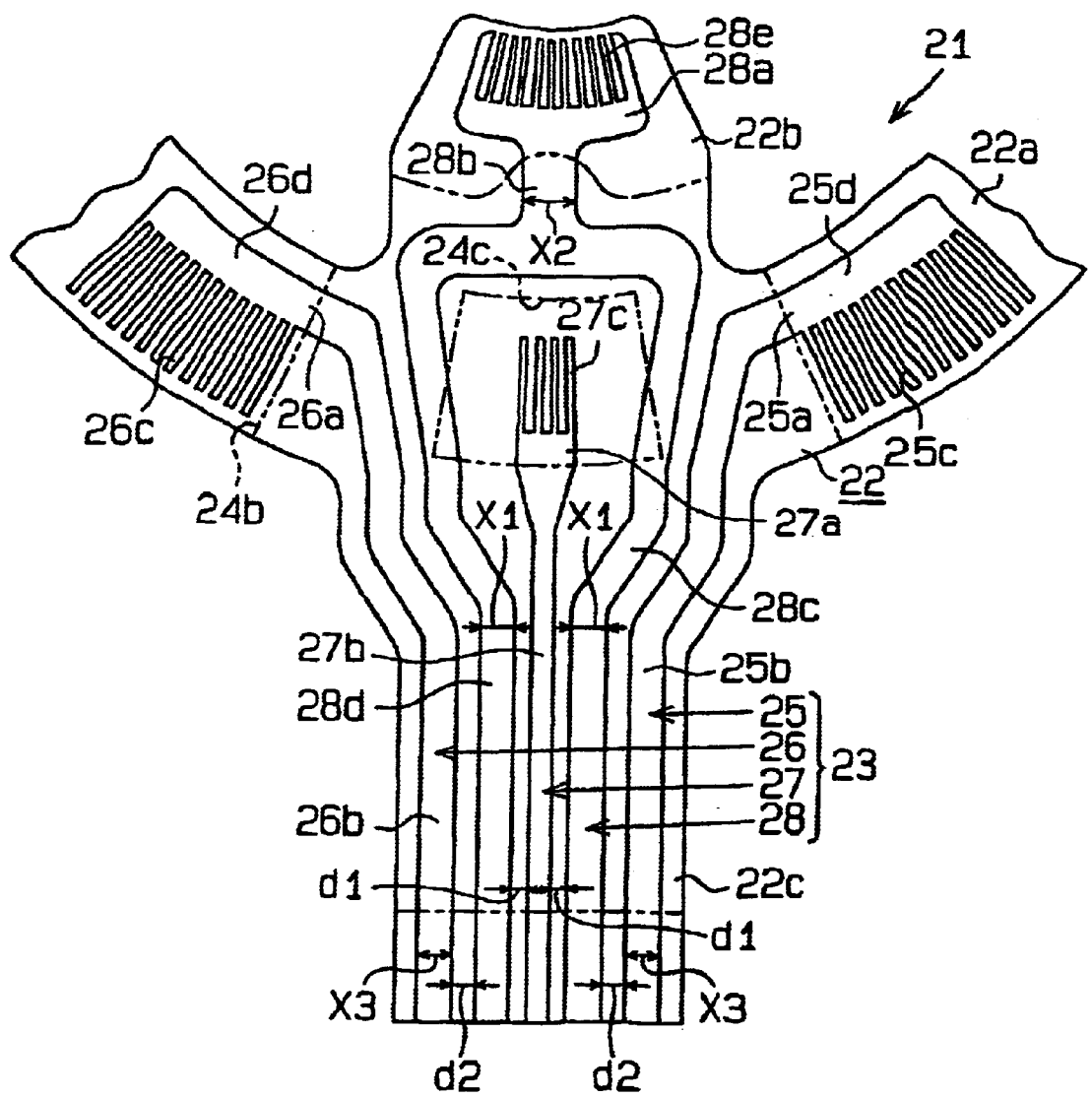
FIG. 10 is an enlarged partial plan view the flexible plate of FIG. 9.

As illustrated in FIG. 10, the conductors 23 include an A-phase conductor 25, a B-phase conductor 26, a feedback conductor 27 and a grounding conductor 28. The feedback conductor 27 includes a proximal end 27a located on the ring 22a and a connector 27b extending from the proximal end 27a through the center of the outer extension 22c to the end of the outer extension 22c. The proximal end 27a corresponds to the feedback electrode 20f and includes a comb-like contact 27c contacting the feedback electrode 20f.

The grounding conductor 28 encompasses the feedback conductor 27. Specifically, the grounding conductor 28 includes a proximal end 28a located in the inner extension 22b of the substrate 22, a neck 28b and pair of connectors 28c, 28d branching from the neck 28b. The connectors 28c, 28d extend to the end of the outer extension 22c along the sides of the feedback conductor 27. The connectors 28c, 28d are symmetric with respect to the feedback conductor 27. That is, the connectors 28c, 28d each have the same width X1 and are spaced from the feedback conductor 27 by a distance d1. The proximal end 28a includes a comb-like contact 28e for contacting the metal plate 11 (see FIG. 1).

The A-phase and B-phase conductors 25, 26 are located outside of the grounding conductor 28. Specifically, the A-phase conductor 25 includes a proximal end 25a located on the ring 22a of the substrate 22 and a connector 25b extending from the proximal end 25a to the end of the outer extension 22c along a branch of the grounding conductor 28 (the right branch as viewed in FIG. 10). The proximal end 25a contacts one end of the A-phase electrode 20a and includes a base 25d extending along the ring 22a and a comb-like contact 25c. The contact 25c includes teeth extending radially from the base 25d. The base 25d is radially offset toward the center of the flexible plate 21.

Likewise, the B-phase conductor 26 includes a proximal end 26a located on the ring 22a and a connector 26b extending from the proximal end 26a to the end of the outer extension 22c along a branch of the grounding conductor 28 (the left branch as viewed in FIG. 10). The proximal end 26a contacts one end of the B-phase electrode 20b and includes a base 26d extending along the ring 22a and a comb-like contact 26c. The contact 26c includes teeth extending radially from the base 26d. The base 26d is radially offset toward the center of the flexible plate 21. The connectors 25b, 26b of the A-phase and B-phase conductors 25, 26 both have the same width X3 and are spaced from the corresponding branch of the grounding conductor 28 by a distance d2.

The neck 28b has the smallest cross-sectional area in the grounding conductor 28. The connectors 25b and 26b have the smallest cross-sectional area in the A-phase and B-phase conductors 25, 26. The cross-sectional area of the neck 28b is equal to the cross-sectional area of the connector 25b or 26b multiplied by $2^{1/2}$. The thickness of the A-phase and B-phase conductors 25, 26 is equal to that of the grounding conductor 28. Therefore, the width X2 of the neck 28b is equal to the width X3 of the connector 25b or 26b multiplied by $2^{1/2}$. Further, the A-phase conductor 25, the B-phase conductor 26 and the grounding conductor 28 are made of the same conductive material. Thus, the resistance of the neck 28b for a unit of length is equal to the resistance of the connectors 25b or 26b for a unit of length divided by $2^{1/2}$, or multiplied by $1/(2^{1/2})$.

The grounding conductor 28 has the branching pair of connectors 28c, 28d. The connectors 28c, 28d are electrically parallel. Therefore, when finding the smallest cross-sectional area of the grounding conductor 28, the cross-sectional area of the neck 28b needs to be compared with the combined cross-sectional area of the connectors 28c, 28d. The combined cross-sectional area of the connectors 28c, 28d is slightly larger than the cross-sectional area of the neck 28b.

As illustrated in FIGS. 8–11, the cover layer 24 includes a reinforcement 24a and a cover 24b. The reinforcement 24a is C-shaped. The cover 24b covers the conductors 25–28 except for the proximal ends 25a–28a. Thus, the proximal ends 25a–28a are exposed on the flexible plate 21. The cover 24b has a window 24c to expose the proximal end 27a of the feedback conductor 27 on the plate 21. The window 24c also exposes part of the connectors 28c, 28d of the grounding conductor 28 on the flexible plate 21. The exposed parts of the connectors 28c, 28d each correspond to the connecting electrodes $20r_1$, $20r_2$, respectively. The cover 24b further exposes the outer ends of the connectors 25b, 26b, 27b, 28c, 28d on the flexible plate 21.

Figure 11:
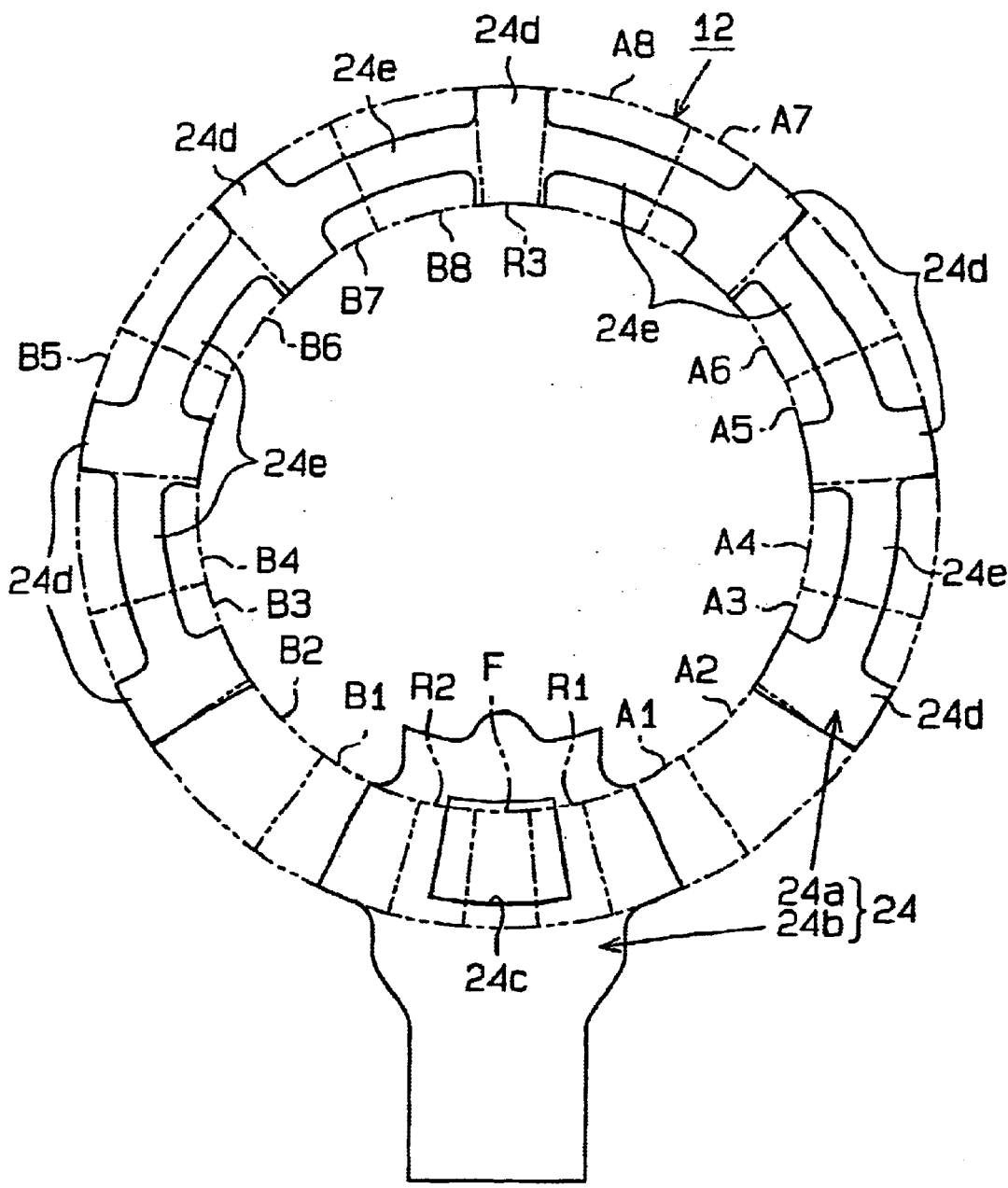
FIG. 11 is plan view showing the cover layer of the flexible plate illustrated in FIG. 8.

As illustrated in FIGS. 9 and 11, the reinforcement 24a includes balancers 24d and connectors 24e. The radial dimension of each balancer 24d is equal to that of the ring 22a. Each connector 24e connects each pair of adjacent balancers 24d. As shown in FIG. 11, each pair of adjacent balancers 24d are spaced apart by a distance corresponding to the combined circumferential length of an adjacent pair of the A-phase and B-phase segments A1–A8, B1–B8. In other words, the balancers 24d are spaced apart by a distance corresponding to one wavelength of a progressive wave produced by the piezoelectric element 13. The balancers 24d are located at such positions that the balancers 24d do not interfere with progressive waves produced by the piezoelectric element 13. In the first embodiment, the number of the balancers 24d is seven. The circumferential length of each balancer 24d is substantially the same as that of the connecting segment R3. One of the balancers 24d corresponds to the connecting segment R3, and the other six balancers 24d are arranged symmetrically with respect to the connecting segment R3.

The flexible plate 21 is fixed to the bottom of the electrode plate 20 such that the distal ends 25a–27a of the conductors 25–27 contact the corresponding electrodes 20a, 20b, 20f. As shown in FIG. 1, the inner extension 22b is bent upward and secured to the bottom of the metal plate 11 of the stator 9. Thus, the contact 28e of the grounding conductor 28, which is located on the inner extension 22b, contacts the bottom of the metal plate 11. The neck 28b of the grounding conductor 28 facilitates bending of the inner extension 22b and thus prevents the inner extension 22b from interfering with vibration of the piezoelectric element 13. In an assembled motor 1, the inner extension 22b is located between the metal plate 11 and the gasket 8.

As illustrated in FIG. 1, the distal end of the outer extension 22c of the flexible plate 21 is exposed to the outside of the motor housing 2. The exposed parts of the conductors 25–28 are connected to the lead line 30 The controller applies high frequency voltage to the A-phase segments A1–A8 and the B-phase segments B1–B8 through the lead line 30, the A-phase and B-phase 25, 26 and the A-phase and B-phase electrodes 20a, 20b. The feedback segment F produces voltage based on vibration caused by voltage applied to the segments A1–A8 and B1–B8. The voltage generated by the segment F is sent to the controller through the feedback electrode 20f, the feedback conductor 27 and the lead line 30. When high-frequency voltage is applied to the piezoelectric element 13, a grounding current flows to the controller through the piezoelectric element 13, the base ring 12, the diaphragm 10, the metal plate 11, the grounding conductor 28 and the lead line 30.

As illustrated in FIGS. 9 and 10, the flexible plate 21 includes the A-phase conductor 25, the B-phase conductor 26 and the grounding conductor 28. The conductors 25, 26, 28, which lead high frequency voltage to the piezoelectric element 13, are formed on the single plate 21. This structure simplifies the wiring of the motor 1 thereby facilitating the assembly of the motor 1.

The grounding conductor 28 formed on the inner extension 22b of the flexible plate 21 is not directly connected to the piezoelectric element 13, which produces vibration. Instead, the grounding conductor 28 is electrically connected to the metal ring plate 11, which is separated from the piezoelectric element 13. This structure prevents the grounding conductor 28 from being electrically disconnected from the piezoelectric element 13 by vibration of the element 13.

In FIG. 1, the inner extension 22b is located between the metal ring plate 11 and the gasket 8. However, the inner extension 22b may be located between the metal ring plate 11 and the diaphragm 10, and the grounding conductor 28 on the inner extension 22b may be electrically connected to the diaphragm 10.

High frequency voltages are applied to each of the A-phase and B-phase segments A1–A8, B1–B8 on the piezoelectric element 13 through the A-phase and B-phase conductors 25, 26. The voltages supplied to the A-phase and B-phase segments A1–A8 and B1–B8 have the same amplitude and have a phase difference of ninety degrees. The composite voltage of the voltages applied to the segments A1–A8 and B1–B8 has a peak value that is equal to the peak value of each voltage multiplied by $2^{1/2}$. The smallest cross-sectional area of the grounding conductor 28, or the cross-sectional area of the neck 28b, is therefore set equal to the smallest cross-sectional area of one of the A-phase and B-phase conductors 25, 26 multiplied by $2^{1/2}$. Thus, when the currents in the conductors 25, 26, 28 reach the peak value, the current density in the neck 28b is equal to the current density in the connectors 25b, 26b. The durability of the conductors 25, 26, 28 is equalized in this manner. Further, this construction minimizes the cross-sectional area of the neck 28b.

The combined cross-sectional area of the connectors 28c, 28d of the grounding conductor 28 may be equal to the cross-sectional area of one of the connectors 25b, 26b multiplied by $2^{1/2}$. The cross-sectional area of the grounding conductor 28 may be equal to the cross-sectional area of one of the connectors 25b, 26b multiplied by $2^{1/2}$ at any point along the conductor 28.

If the A-phase and B-phase conductors 25, 26 are made of a different conductive material from that of the grounding conductor 28, the cross-sectional area of the conductors 25, 26 and 28 is determined based on the resistance value of the conductors 25, 26, 28 per unit length. That is, the cross-sectional areas of the conductors 25, 26 and 28 are determined such that the resistance value per unit length in a part of the grounding conductor 28 having the smallest cross-sectional area is equal to the resistance value per unit length in a part of one of the A-phase and B-phase conductors 25, 26 having the smallest cross-sectional area multiplied by $\frac{1}{2}^{1/2}$.

As illustrated in FIG. 10, the connectors 28c, 28d of the grounding conductor 28 are arranged on both sides of the feedback conductor 27, and the A-phase and B-phase conductors 25, 26 are arranged outside of the connectors 28c, 28d. Therefore, voltage generated by the feedback segment F is scarcely affected by noise generated by high frequency voltage in the A-phase and B-phase conductors 25, 26. This allows the controller to accurately feedback control the high-frequency voltage supplied to the motor 1 based on the voltage generated by the feedback segment F.

The connectors 28c, 28d both have the same width X1 and are spaced from the feedback conductor 27 by the same distance d1. Further, connectors 25b, 26b of the A-phase and B-phase conductors 25, 26 have the same width X3 and are spaced from the grounding conductor 28 by the same distance d2. Thus, the voltage generated by the segment F is influenced by the same amount from both the left and right sides. The distance d1 may be equal to the distance d2.

As illustrated in FIG. 10, the window 24c formed in the cover 24b exposes not only the proximal end 27a of the feedback conductor 27 but also a part of the grounding conductor 28 on the flexible plate 21. The exposed part of the grounding conductor 28 contacts the connecting electrodes $20r_1$, $20r_2$ (see FIG. 8). Therefore, the connecting segments R1, R2, between which the feedback segment F is located, are connected to the grounding conductor 28 through the connecting electrodes $20r_1$, $20r_2$. Thus, the voltage generated by the feedback segment F is not influenced by the voltage generated by the adjacent segments R1, R2.

The proximal ends 25a, 26a of the A-phase and B-phase conductors 25, 26 are only below the end portion of the A-phase and B-phase electrodes 20a, 20b. In comparison, if the A-phase and B-phase conductors 25, 26 were to extend below the entire A-phase and B-phase electrodes 20a, 20b, the construction of the first embodiment would hinder vibration of the piezoelectric element 13 and the production cost of the conductors 25, 26 would increase.

As illustrated in FIG. 10, the proximal ends 25a, 26a of the A-phase and B-phase conductors 25, 26 each include the base 25d, 26d extending circumferentially along the ring 22a and the contacts 25c, 26c extending radially from the base 25d, 26d. The contacts 25c, 26c have comb-like teeth. Compared to conductor having plate-like contact, the contacts 25, 26 scarcely hinder vibration of the piezoelectric element 13.

The magnitude of vibration generated by the piezoelectric element 13 is stronger toward the other periphery of the element 13. Vibration of a greater magnitude increases the power of the motor 1. In the first embodiment, the plate-shaped bases 25d, 26d are located at the radially inner portion of the ring 22a, and the comb-like contacts 25c, 26c extend radially outward from the bases 25d, 26d. This construction does not hinder strong vibration, which is generated in the radially outer portion of the piezoelectric element 13, thereby improving the power of the motor 1. The contacts 25c, 26c may be radially shorter such that their distal ends do not reach the outer limit of the ring 22a. This structure further prevents the contacts 25c, 26c from hindering strong vibration.

Figure 12:
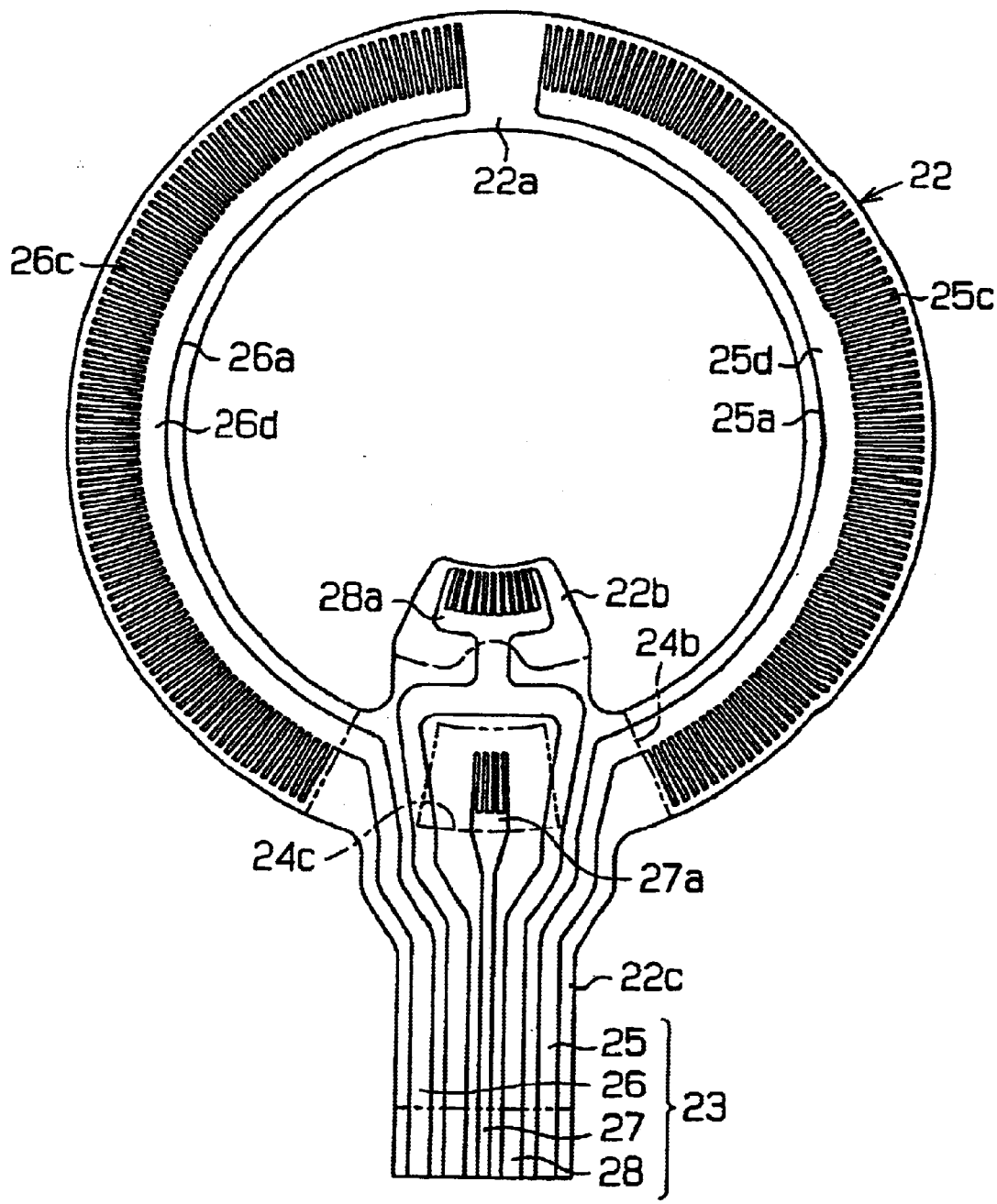
FIG. 12 is a plan view showing a flexible plate of another embodiment.

As illustrated in FIG. 12, the proximal ends 25a, 26a of the A-phase and B-phase conductors 25, 26 may extend along the entire range of the electrodes 20a, 20b. In this case, the reinforcement 24a of the cover layer 24 is not necessary.

As illustrated in FIG. 9, the flexible plate 21 includes the reinforcement 24a, which does not overlap the conductors 23. The reinforcement 24a adds rigidity to the plate 21 and stabilizes vibration generated by the piezoelectric element 13. The conductors 23 slightly suppress vibration of the piezoelectric element 13. The balancers 24d also slightly suppress vibration thereby stabilizing the vibration of the element 13 along the circumferential direction. This stabilizes the rotation of the motor 1. The connectors 24e connecting the balancers 24d add rigidity to the plate 21 and are sufficiently narrow to prevent the reinforcement 24a from interfering with the vibration of the element 13.

As illustrated in FIG. 11, the balancers 24d are spaced apart by a distance corresponding to one wavelength of the progressive waves produced by the piezoelectric element 13. This structure further stabilizes the vibration generated by the element 13.

Like the cover 24b, the reinforcement 24a is made of polyimide resin. In comparison, if the reinforcement 24a and the cover 24b are made of different materials, forming the cover 24b and the reinforcement 24a is more expensive and less efficient. However, the reinforcement 24a and the cover 24b may be made of different materials suitable for reinforcing the structure of the motor 1.

Figure 13:
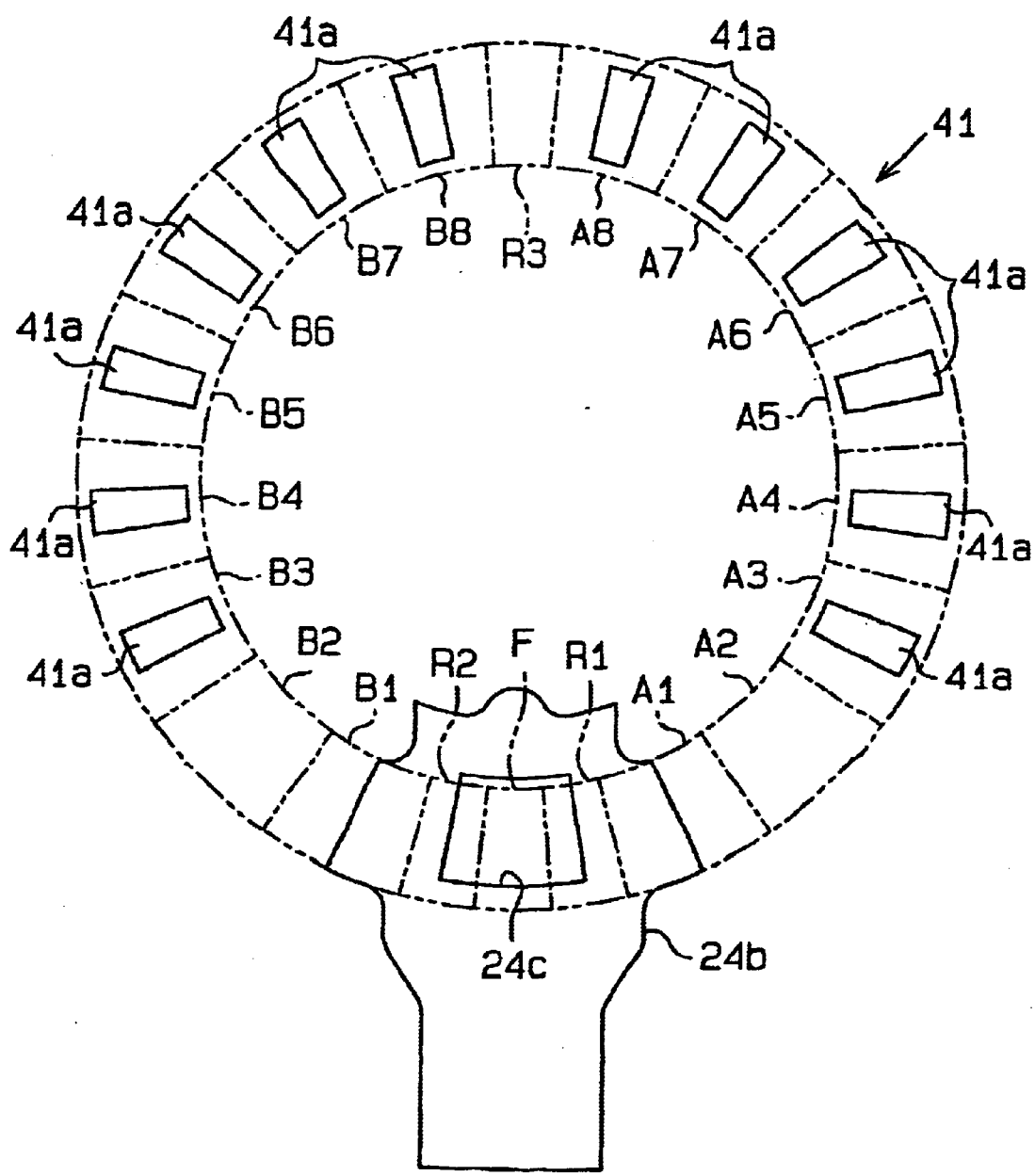
FIG. 13 is a plan view showing a cover layer of another embodiment.
Figure 14:
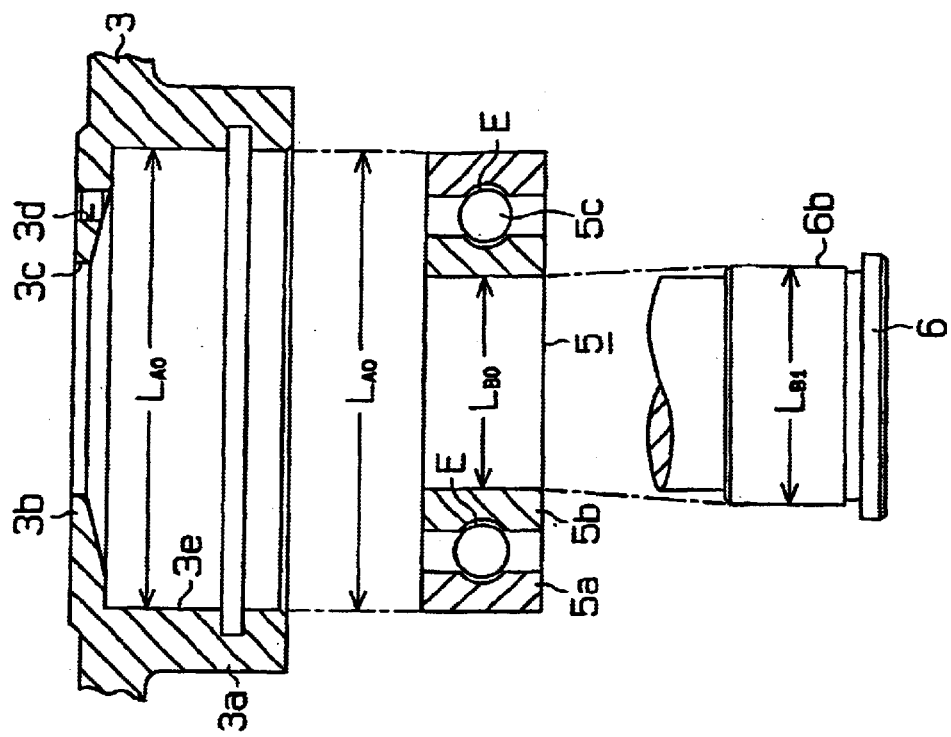
FIG. 14 is a partial cross-sectional view showing the bearing structure of the motor illustrated in FIG. 1.
Figure 15:
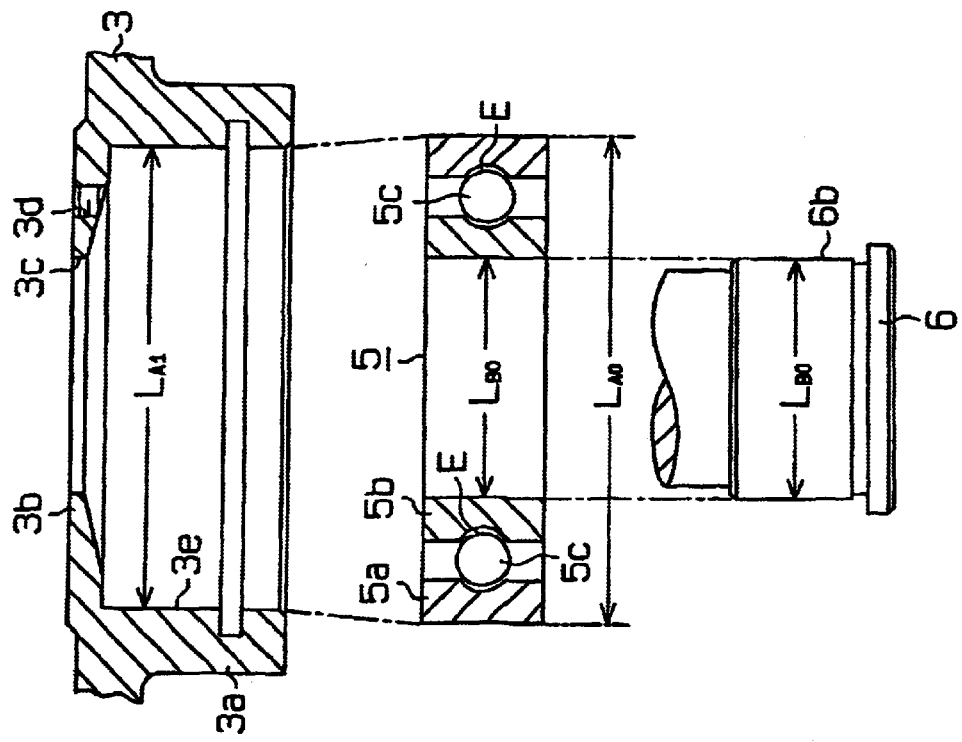
FIG. 15 is a partial cross-sectional view like FIG. 14 showing a bearing structure of another embodiment.

A reinforcement 41 illustrated in FIG. 13 may be employed. The reinforcement 41 includes twelve reinforcing pieces 41a. The pieces 41a are located on the flexible plate 21 to correspond to each of the A-phase and B-phase segments A3–A8, B3–B8. This structure also stabilizes vibration generated by the piezoelectric element 13.

The mounting structure of the radial ball bearing 5 will now be described. As illustrated in FIG. 1, the radial ball bearing 5 includes an outer race 5a, an inner race 5b and balls 5c. The outer race 5a is press fitted in the boss 3a, and the inner race 5b is adhered to a large diameter portion 6b of the shaft 6. The balls 5c are located between the races 5a and 5b. Generally, the bearing 5 is designed such that clearance exists between each ball 5c and the races 5a, 5b. The clearance compensates for dimensional errors that are created during manufacture. However, if the radial ball bearing 5, which has the clearance, is assembled in the motor 1, the clearance causes the shaft 6 to chatter. This destabilizes rotation of the motor 1.

In this embodiment, the bearing 5 is installed in the boss 3a such that the balls 5c are always in contact with the races 5a, 5b. Specifically, the bearing 5 has clearance E between the balls 5c and the races 5a, 5b before the bearing 5 is installed. The outer diameter of the outer race 5a is represented by $L_{A0}$, and the inner diameter of the inner race 5b is represented by $L_{B0}$.

The outer diameter of the large diameter portion 6b is equal to the inner diameter $L_{B0}$ of the inner race 5b. The diameter $L_{A1}$ of the inner wall 3e of the boss 3a is slightly smaller than the outer diameter $L_{A0}$ of the outer race 5a. Thus, when assembling the bearing 5 to the boss 3a and the shaft 6, the outer race 5a is press fitted in the boss 3a. This deforms the outer race 5a such that the balls 5c contact the races 5a, 5b.

The rotary shaft 6 thus does not chatter and vibration of the shaft 6 does not interfere with the piezoelectric element 13. Rotation of the motor 1 is therefore stabilized.

Constant contact between the balls 5c and the races 5a, 5b does not increase the rolling friction of the balls 5c. Thus, the construction of the first embodiment does not hinder the rotation of the shaft 6.

The radial ball bearing 5 is not a special bearing in which the balls constantly contact the races before assembly, but is a typical bearing in which there is a clearance between the balls and the races. In other words, the motor 1 does not require a specially designed bearing. This reduces the manufacture cost. However, a specially designed bearing in which the balls contact the race before assembly may be used.

Figure 16:
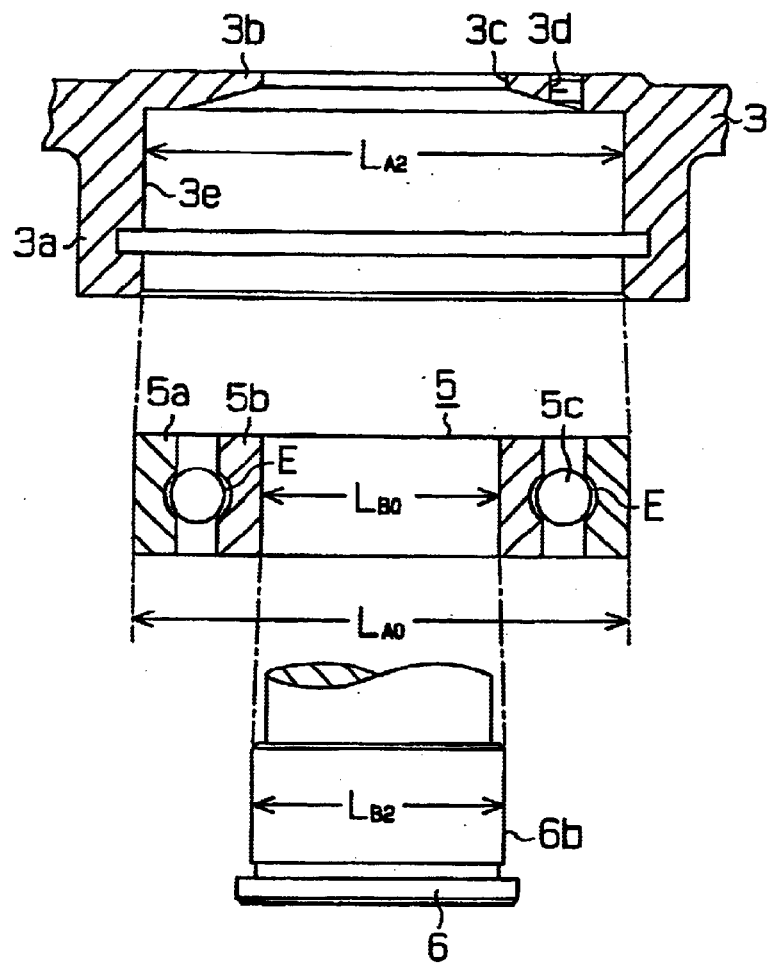
FIG. 16 is a partial cross-sectional view like FIG. 14 showing a bearing structure of another embodiment.

As illustrated in FIG. 16, the outer diameter of the rotor's large diameter portion 6b may be a value $L_{B1}$, which is slightly larger than the inner diameter $L_{B0}$ of the inner race 5b, and the inner diameter of the inner wall 3e of the boss 3a may be equal to the outer diameter $L_{A0}$ of the outer race 5a. In this case, when the bearing 5 is engaged with the boss 3a and the rotary shaft 6, the large diameter portion 6b is press fitted into the inner race 5b. This deforms the inner race 5b such that the balls 5c contact the races 5a, 5b.

As illustrated in FIG. 16, the outer diameter of the large diameter portion 6b may be $B_{B2}$, which is slightly larger than the inner diameter $L_{B0}$ of the inner race 5b, and the inner diameter of the inner wall 3e of the cylindrical wall 31 may be $L_{A2}$, which is slightly smaller than the outer diameter $L_{A0}$ of the outer race 5a. In this case, the outer race 5a is press fitted in the boss 3a and the large diameter portion 6b is press fitted in the inner race 5b. Accordingly, the outer race 5a and the inner race 5b are both deformed such that the balls 5c contact the races 5a, 5b.

Figure 17:
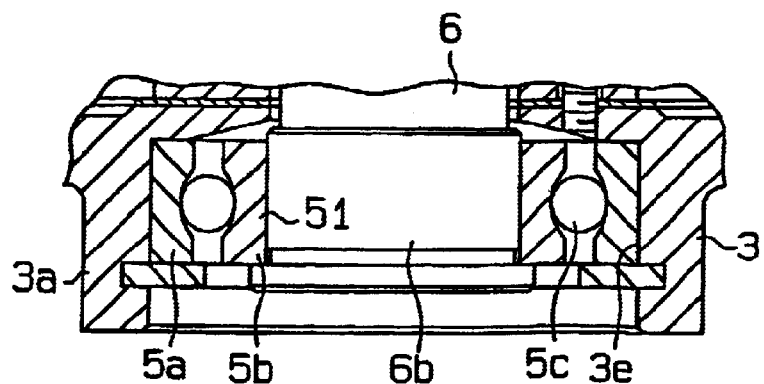
FIG. 17 is a partial cross-sectional view showing a bearing of another embodiment.
Figure 18:
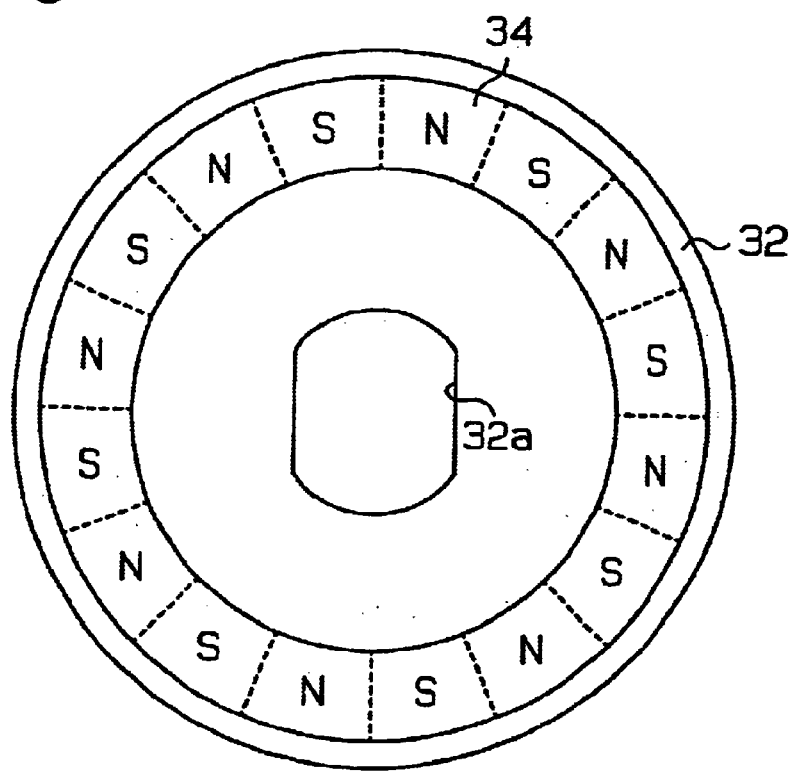
FIG. 18 is a plan view showing the supporting plate and the magnet ring of the motor illustrated in FIG. 1.
Figure 19:
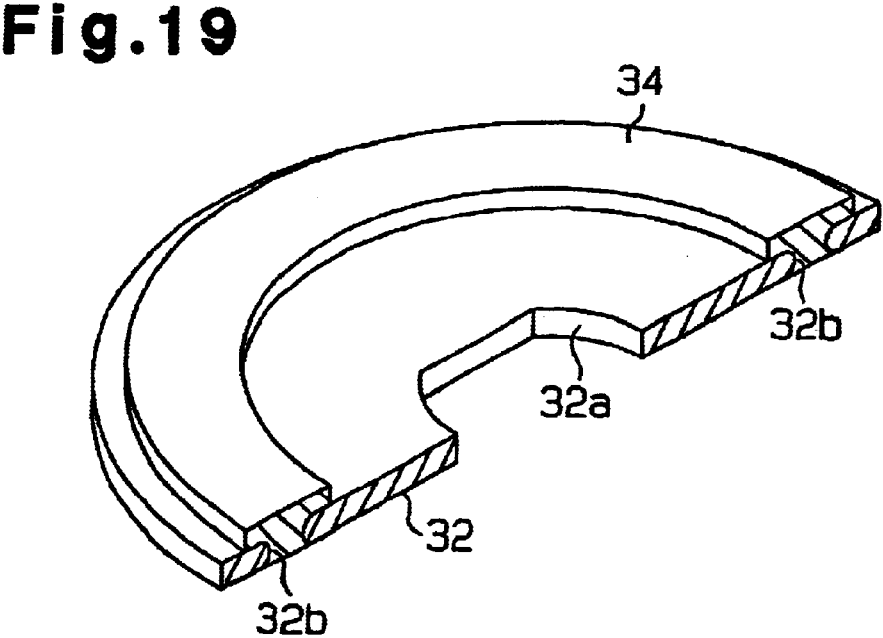
FIG. 19 is a perspective cross-sectional view illustrating the supporting plate and the magnet ring of FIG. 18.
Figure 20:
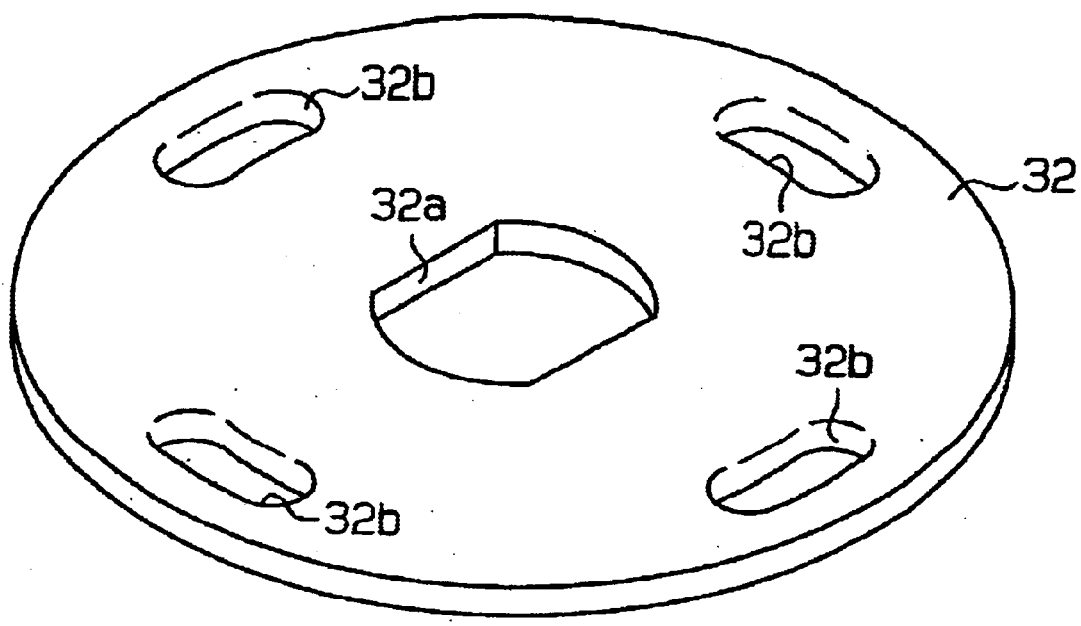
FIG. 20 is a perspective view illustrating the supporting plate of FIG. 18.

In the bearing 5 of FIG. 1, the balls 5c contact the races 5a, 5b such that the races 5a, 5b do not chatter either in the radial or axial direction. However, a bearing 51 illustrated in FIG. 17 may be employed. The balls 5c of the bearing 51 contact the races 5a, 5b such that the races 5a, 5b do not chatter at least in the radial direction. This bearing 51 prevents the shaft 6 from chattering at least in the radial direction.

The motor 1 of FIG. 1 includes a device for detecting the speed of the rotor 15. That is, as illustrated in FIGS. 1 and 18–20, a magnet ring 34 is fixed to the upper surface of the supporting plate 32, which is a part of the pressing member 19. The magnet ring 34 includes north poles and south poles, which are alternately arranged in the circumferential direction. The supporting plate 32 has four holes 32b. As shown in FIG. 1, the radial dimension of each hole 32b decreases toward the center plane of the supporting plate 32.

Magnetic material is casted to fill the holes 32b for integrally forming the magnet ring 34 with the supporting plate 32. The shape of the holes 32b is effective for securing the magnet ring 34 to the supporting plate 32. Further, the method of forming the ring 34 is easier than a method in which separately formed supporting plate and magnet ring are assembled. However, a separately formed magnet ring 34 may be assembled to the support plate 32.

As illustrated in FIG. 1, a magnetic sensor 35 is located in the inner wall of the cover 4 to face the magnet ring 34. The sensor 35 includes, for example, a Hall element and is connected to the controller by the connector 29 located on the cover 4.

When the ring 34 rotates integrally with the support plate 32, the direction of magnetic flux in the sensor 35 changes alternately. The sensor 35 outputs electric signals based on direction changes of the magnetic flux to the controller. The controller computes the speed of the support plate 32, or the speed of the rotor 15, based on the signals from the sensor 35.

Vibration of the stator 9 is transmitted to the rotor 15. If the magnet ring 34 is directly fixed to the rotor 15, the magnet ring 34 affects the vibration transmitted to the rotor 15. Further, the vibration of the magnet ring 34 prevents the speed of the rotor 15 from being accurately detected.

However, in the illustrated embodiment, the magnet ring 34 is not directly secured to the rotor 15, but is fixed to the supporting plate 32, which integrally rotates with the rotor 15. This construction prevents ring 34 from interfering with the vibration of the rotor 15.

The magnet ring 34 is located relatively close to the outer edge of the supporting plate 32. This structure enlarges the size of the ring 34 compared to a case in which the magnet ring 34 is located closer to the center of the plate 32. A larger magnet ring 34 provides larger areas for the north and south poles of the magnet ring 34. This improves the accuracy of the sensor 35.

The location of the magnet ring 34 and the sensor 35 may be changed. For example, the magnet ring 34 may be secured to the circumference of the supporting plate 32, and the magnetic sensor 35 may be located on the inner side wall of the cover 4 to face the ring 34.

Instead of the magnetic detection means, optical detection means may be used for detecting the speed of the rotor 15.

The motor illustrated in FIG. 1 is a progressive wave type ultrasonic motor. However, the present invention may be employed in a stationary wave type ultrasonic motor.

Therefore, the present examples and embodiments are to be considered as illustrative and not restrictive and the invention is not to be limited to the details given herein, but may be modified within the scope and equivalence of the appended claims.

What is claimed is:

1. An ultrasonic motor, comprising:
   a stator having an annular piezoelectric element, wherein the piezoelectric is polarized into a plurality of segments along the circumference;
   a rotor arranged to face the stator, wherein the piezoelectric element vibrates the stator such that the rotor is rotated, and wherein the piezoelectric element has a first surface facing the stator and a second surface opposite from the first surface;
   an electrode plate fixed to the second surface of the piezoelectric element; and
   a flexible plate fixed to the electrode plate, wherein the flexible plate includes:
      a flexible substrate;
      a conductor arranged on part of the flexible substrate to be electrically connected to the electrode plate; and
      a reinforcement arranged on the flexible substrate at a position that is off the conductor,
   wherein the conductor suppresses vibration generated at a portion of the piezoelectric element that corresponds to the conductor, and wherein the reinforcement suppresses vibration generated at a portion of the piezoelectric element that is off the conductor, thereby stabilizing vibration of the piezoelectric element in the circumferential direction.

2. The motor according to claim 1, wherein the reinforcement is formed such that the rigidity of the flexible plate changes at an interval that corresponds to one or half wavelength of vibration generated by the piezoelectric element.

3. The motor according to claim 1, wherein the reinforcement reinforces the flexible substrate at positions spaced by an interval that corresponds to one or half wavelength of vibration generated by the piezoelectric element.

4. The motor according to claim 1, wherein the reinforcement includes a plurality of balancing portions and a plurality of connecting portions, wherein the balancing portions are spaced by a predetermined interval in the circumferential direction of the piezoelectric element, and wherein each connecting portion connects an adjacent pair of the balancing portions.

5. The motor according to claim 4, wherein the balancing portions suppress vibration generated at a portion of the piezoelectric element that is off the conductor.

6. The motor according to claim 5, wherein the connecting portions are thinner than the balancing portions in respect of the radial direction of the piezoelectric element so that the connecting portions do not hinder vibration of the piezoelectric element.

7. The motor according to claim 4, wherein the balancing portions are arranged at an interval that corresponds to one or half wavelength of vibration generated by the piezoelectric element.

8. The motor according to claim 4, wherein the balancing portions and the connecting portions are integrally formed.

9. The motor according to claim 1, wherein the flexible plate further includes a cover portion that partly covers the conductor, and wherein the cover portion is formed of the same material as the reinforcement.

10. The motor according to claim 1, wherein the segments of the piezoelectric element include a group of A-phase segments and a group of B-phase segments, wherein high frequency voltages of different phases are applied to the A-phase segment group and the B-phase segment group, respectively, wherein the electrode plate includes an A-phase electrode corresponding to the A-phase segment group and a B-phase electrode corresponding to the B-phase segment group, wherein the conductor includes an A-phase conductor member corresponding to the A-phase electrode and a B-phase conductor member corresponding to the B-phase electrode, and wherein each of the A-phase conductor member and the B-phase conductor member has an end portion that contacts only a part of the corresponding one of the A-phase electrode and the B-phase electrode.

11. The motor according to claim 10, wherein each end portion includes a base portion and a comb-like portion, wherein the base portion extends along the circumferential direction of the piezoelectric element, and wherein the comb-like portion extends outward from the base portion in respect of the radial direction of the piezoelectric element.

12. The motor according to claim 10, wherein the segments of the piezoelectric element further include a feedback segment located between the A-phase segment group and the B-phase segment group, wherein the electrode plate further includes a feedback electrode corresponding to the feedback segment, wherein the conductor further includes a feedback conductor member contacting the feedback electrode and a grounding conductor member surrounding the feedback conductor member, and wherein the A-phase conductor member and the B-phase conductor member are located outside of the grounding conductor member.

13. A flexible plate fixed to a piezoelectric element with an electrode plate in between, the piezoelectric element including a plurality of polarized segments, the flexible plate comprising:

a flexible substrate;

a conductor arranged on part of the flexible substrate to be electrically connected to the electrode plate; and a reinforcement arranged on the flexible substrate at a position that is off the conductor, wherein the conductor suppresses vibration generated at a portion of the piezoelectric element that corresponds to the conductor, and wherein the reinforcement suppresses vibration generated at a portion of the piezoelectric element that is off the conductor, thereby stabilizing vibration of the piezoelectric element in the circumferential direction.

14. The flexible plate according to claim 13, wherein the reinforcement is formed such that the rigidity of the flexible plate changes at an interval that corresponds to one or half wavelength of vibration generated by the piezoelectric element.

15. The flexible plate according to claim 13, wherein the reinforcement reinforces the flexible substrate at positions spaced by an interval that corresponds to one or half wavelength of vibration generated by the piezoelectric element.

16. The flexible plate according to claim 13, wherein the reinforcement includes a plurality of balancing portions and a plurality of connecting portions, wherein the balancing portions are spaced by a predetermined interval in a direction along which the piezoelectric element extends, and wherein each connecting portion connects an adjacent pair of the balancing portions.

17. The flexible plate according to claim 16, wherein the balancing portion suppresses vibration generated at a portion of the piezoelectric element that is off the conductor.

18. The flexible plate according to claim 17, wherein the connecting portions are thinner than the balancing portions so that the connecting portions do not hinder vibration of the piezoelectric element.

19. The flexible plate according to claim 16, wherein the balancing portions are arranged at an interval that corresponds to one or half wavelength of vibration generated by the piezoelectric element.

20. The flexible plate according to claim 16, wherein the balancing portions and the connecting portions are integrally formed.

21. The flexible plate according to claim 13, wherein the flexible plate further includes a cover portion that partly covers the conductor, and wherein the cover portion is formed of the same material as the reinforcement.

* * * * *